United States Patent [19]

Kotski

[11] Patent Number: 4,958,250
[45] Date of Patent: Sep. 18, 1990

[54] VOLTAGE ISOLATION APPARATUS FOR SERVICE TRANSFORMERS

[76] Inventor: Edward J. Kotski, 124 Pleasantview Rd., Hackettstown, N.J. 07840

[21] Appl. No.: 767,108

[22] Filed: Aug. 19, 1985

[51] Int. Cl.$^5$ .............................................. H02H 7/10
[52] U.S. Cl. ...................................... 361/40; 361/56; 361/91
[58] Field of Search ...................... 361/38, 40, 56, 91, 361/100, 110, 111, 117, 118, 119; 119/14.03, 14.08; 307/326-328

[56] References Cited

U.S. PATENT DOCUMENTS

| | | | |
|---|---|---|---|
| 2,087,340 | 7/1937 | Davis | 361/39 X |
| 3,213,349 | 10/1965 | Gulzwiller | 361/56 X |
| 4,186,418 | 1/1980 | Seiler | 361/91 |
| 4,217,618 | 8/1980 | Kellenbenz et al. | 361/91 X |
| 4,237,509 | 12/1980 | Asplund | 361/56 |
| 4,475,139 | 10/1984 | Chadwick | 361/56 X |
| 4,509,089 | 4/1985 | Suedberg | 361/91 X |

OTHER PUBLICATIONS

"Stray Voltage Problems with Dairy Cows" by Cloud et al., Publication 125, Agricultured Extension Service Univ. of Minnesota, 1980.

Primary Examiner—D. Jennings

[57] ABSTRACT

A switching apparatus (30) provides a normally high impedance connection which is capable of switching currents with high magnitudes and high rates of rise between the primary (12) and secondary (15) neutrals of a service transformer (13), such as that used to supply power to a farmstead, such that undesirable voltages appearing on the primary neutral line are not transmitted to the secondary neutral. Upon the occurrence of a fault at the distribution transformer, or a surge on the power line, the switching apparatus (30) rapidly switches to provide a low resistance connection between the primary and secondary neutrals so that any fault current passing from the primary to the secondary of the transformer will be shunted back to the primary neutral. The apparatus preferably includes a pair of high speed electronic switches (34, 35), such as SCR thyristors, connected in parallel with opposite polarity, the combined SCR's connected in series with an inductor, and the resulting series-parallel combination connected in parallel with a varistor between the primary and secondary neutrals.

6 Claims, 2 Drawing Sheets

VOLTAGE ISOLATION APPARATUS FOR SERVICE TRANSFORMERS

TECHNICAL FIELD

This invention pertains generally to the field of power distribution systems and apparatus therefor, and particularly to devices which combine high speed electrical connecting with high "di/dt" capability, as is necessary, for example, when closing during a lightning stroke.

BACKGROUND ART

Stray electrical currents associated with farm installations, particularly dairying equipment, can present a significant economic problem for farm operations. Dairy operations are susceptible to stray electricity because cows are extremely sensitive to electricity, much more so than humans, and will respond to potentials as low as one volt or less. The inherently moist environment of milking parlors and stalls further aggravates the stray voltage situation and makes contact between any stray electricity and the cows more probable. Dairy cattle affected by stray voltages will exhibit nervousness and a reluctance to enter the milking parlor, and may exhibit decreased milk production and increased levels of mastitis infection.

Stray voltage problems on farms usually have many causes. As a consequence, it is difficult and time consuming to detect all possible causes. A significant factor in excessive stray voltages on the secondary ground line is an inadequate grounding system. Such problems are described in a report by H. A. Cloud, et al "Stray Voltage Problems with Dairy Cows" North Central Regional Extension Publication 125. As noted in this report, in accordance with the National Electrical Code, neutrals and grounding conductors in the barn are bonded to the grounding terminal in the barn service entrance. The grounding terminal at the service entrance is bonded to the secondary neutral at the service transformer which in turn is bonded to the neutral line of the primary of the transformer. The purpose of the direct electrical connection between the primary or utility ground and the secondary or farm ground is to prevent the imposition of a very high voltage on the secondary lines if the transformer breaks down and a short circuit between the primary and secondary occurs. The connection between primary and secondary grounds will shunt the current back to the utility neutral, protecting the farm service lines from overvoltage and generally causing the utility fuses to interrupt current flow into the transformer. Since all parts of the grounded neutral network have some resistance to current flow, there can exist potential differences between portions of the neutral system and true ground. Potential differences in the power system's neutral are transmitted to the farm system by the electrical link between the primary and secondary neutral lines.

Several approaches have been proposed for blocking or isolating the voltage on the utility neutral from the secondary neutral. One approach involves the disconnection of the primary neutral from the secondary neutral at the distribution transformer.

This approach is the most practical and least expensive known to date, but merely opening the link can cause more problems than it solves. The ideal method of opening the link would include a means for closing it, very rapidly, in the event of trouble on the secondary system.

None of the approaches heretofore used or proposed are entirely satisfactory. For example, the installation of a spark gap or distribution arrester between the two neutrals has been suggested. Isolation of the primary and secondary neutrals in this manner may not, however, provide adequate protection against hazardous shocks to humans and animals or damage to equipment if a primary to secondary fault should develop within the transformer. Because of the potential danger, this approach is not acceptable to many power companies.

An alternative is the installation of a one-to-one isolation transformer on the secondary side of the main distribution transformer whereby the primary and secondary neutrals of the isolation transformer are electrically isolated from one another. In the event of a primary to secondary fault in the isolation transformer, the maximum voltage imposed on the secondary neutral would be 240 volts AC. Although such an approach is used, it has several drawbacks, of which cost is the most important.

Electronic switches have been proposed which will close swiftly when potential differences appear between the neutrals. For example, U.S. patent application No. 537,841 (group 214), filed Sept. 30, 1983 by H. Tachick and E. Kotski (the present inventor), now abandoned, describes such a switch. Other switches are described in the references.

The drawback to these and other such electronic switches is their limited capability to "close in" on current sources which have high rates of rise and high magnitudes. They work properly when the source is limited in the amount of current it can deliver and in the rate of rise at which the current will be delivered. These switches will perform as intended in power supplies, inverters, and other such "normal" environments but be destroyed by a good size lightning bolt.

My invention is an electronic switch which will successfully close in on lightning surges of several tens of thousands of amperes having rise times in the order of 1 to 10 microseconds. This is about ten times the severity achieved by the present "state of the art" switches. How this is accomplished is described below.

SUMMARY OF THE INVENTION

In accordance with the present invention, high speed electronic switching apparatus is connected between the primary and secondary neutrals of the distribution transformer which normally provides a very high impedance between the primary and secondary neutrals. This high impedance will block any relatively low AC or DC voltages on the primary neutral, e.g., in the range of 10 to 40 volts, which would otherwise be transmitted directly to the secondary neutral line if the customary direct electrical connection between these lines were present. However, if a surge in voltage occurs across the two neutral lines, such as might be caused by a breakdown within the transformer and a short from the primary to the secondary, the switching apparatus is triggered to electrically connect the primary and secondary neutral lines together with a very low resistance connection so that the surge current has a low resistance path back to the utility neutral line, thereby preventing a hazardous voltage from developing on the secondary neutral. As soon as the voltage across the neutrals returns to a low voltage such as a zero potential the switching apparatus resets itself and provides high impedance between the two neutral lines. The triggering and resetting of the switching apparatus for overvoltages preferably occurs on each half cycle of the AC voltage across the neutral lines, with triggering from high impedance to low impedance occuring as the voltage exceeds a selected positive triggering level on the positive portion of the cycle and a selected negative triggering level on the negative portion of the cycle. Triggering will also occur if a DC voltage exceeds the trigger voltage level.

In a preferred embodiment, the apparatus includes two thyristors connected in parallel and with opposite polarity, the combined thyristors connected in series with an inductor, the combined series-parallel components connected in parallel with a varistor and the entire combination connected between two terminals of the apparatus. Each thyristor is controlled by a triggering circuit connected between the gate of the thyristor and the terminal from which current can flowthrough the thyristor when triggered, i.e., the terminal connected to the anode of the thyristor. The triggering circuit preferably includes a series combination of a resistor, a zener diode selected to break-over at the desired triggering voltage, and a diode connected to prevent current from flowing out of the gate of the thyristor. As long as the voltage level across the thyristors is below the break-over voltage of the zener diodes, the thyristors remain in a non-conducting state. When a voltage across the terminals of the device in either direction of polarity exceeds the breakover voltage of one of the zener diodes, a current is passed through the zener into the gate of the thyristor to which it is connected to turn it on. Current will thus be conducted through the thyristor which has its cathode connected to the lower voltage terminal and its anode connected to the higher voltage terminal. Switching of the thyristors in this manner can be accomplished in a very short period of time, preferably on the order of a few micro-seconds or less, thereby preventing substantial voltage levels from developing on the secondary lines that might be damaging to equipment and hazardous to humans and animals.

It should be noted that although the preferred trigger consists of a zener diode network, other trigger circuits could be used. An MOV (metal oxide varistor) system, a Neon bulb, a Diac, a Unijunction or Programable Unijunction Transistor, one of the silicon switches, or an Asymmetrical AC Trigger Switch could also be used, under the proper conditions. Likewise, the current flowing in the MOV of the preferred version could be partially coupled to the gate of the appropriate thyristor.

BEST MODE FOR CARRYING OUT THE INVENTION

Figure 1:
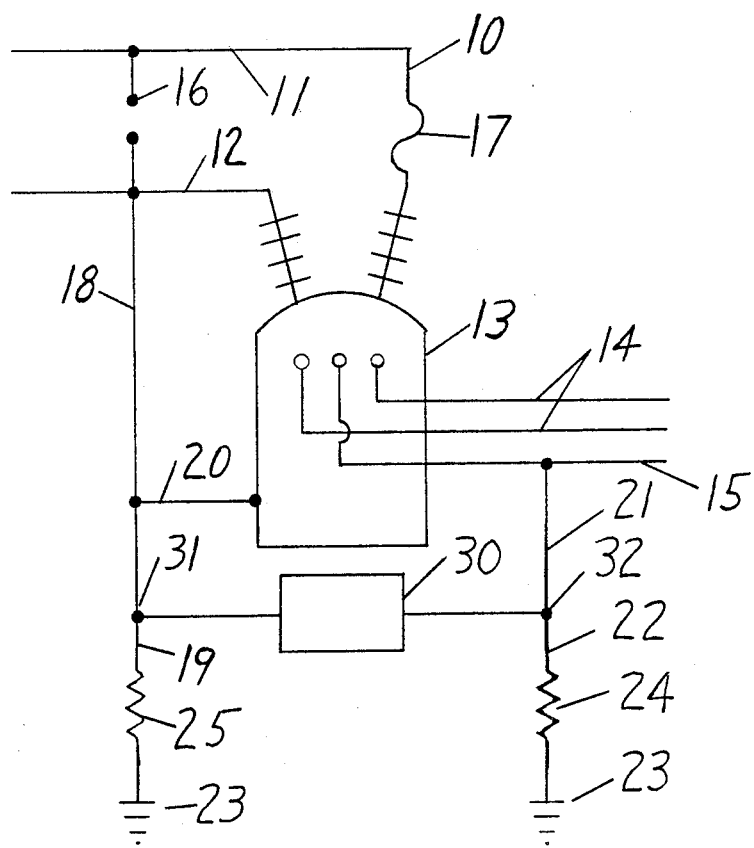
FIG. 1 is a schematic view of an electrical distribution transformer system with the neutral voltage isolation apparatus connected across the primary and secondary neutral lines of the transformer.

With reference to the drawings, a schematic view of the interconnections of a typical single phase service transformer between the power system lines and the service lines is shown generally at 10 in FIG. 1. High voltage power is brought in on single phase power lines 11 and 12 to the primary terminals of a service transformer 13. The secondary of the transformer has the three typical secondary output lines shown, including a pair of secondary power lines 14 which carry 120 volts AC 180 degrees out of phase with one another, and a secondary neutral line 15. A lightning arrester 16 is conventionally connected between the primary lines 11 and 12. A fuse 17 is connected in the primary hot line 11 near the primary terminal of the transformer, and the primary neutral line 12 is connected through a grounding wire 18 to a grounding rod 19 driven into the ground at a position near the pole on which the transformer is mounted. The metal tank of the transformer 13 is connected by a conductor 20 to the primary ground conductor 18. In accordance with accepted practice, at least one conductor 21 is connected from the secondary neutral line to a grounding rod 22 at the service entrance. Additional ground lines may also be connected to the secondary neutral 15 to provide a connection to ground at other points in the electrical service system, as typically is done in a dairy farm facility.

Because of conducting line resistance, imperfect electrical contact between the grounding rod and the surrounding earth, and the character of the ground into which the rod is driven, a certain finite resistance 24 will exist between the secondary neutral line 15 and true ground potential, which is illustratively represented at 23 in FIG. 1 The ssimilar finite resistance between the primary neutral line 12 and true ground 23 is represented by the resistor 25 in FIG. 1. Because of these resistances between the neutral conductors and true ground, the neutrals may float at a potential above true ground, sometimes resulting in current flowing from the secondary neutral to ground by spurious paths. In particular, current may flow from the secondary neutral conductors to true ground through a milk cow, thereby causing a reaction in the cow as described above. If the primary grounding line 18 is connected to the secondary grounding line 21 by a direct low resistance conductor, voltages on the primary grounding line above true ground potential will appear also on the secondary neutral line 15 because of the small but finite resistances 24 and 25 between the grounding lines and true ground. In accordance with the present invention, the customary direct electrical connection between the primary neutral line 12 and the secondary neutral line 15 may be eliminated and a high speed switching apparatus 30 may be connected instead between the primary and secondary neutrals, such as by connection between the primary grounding line 18 and the secondary grounding line 21. The high speed switch 30 normally presents a very high impedance between the lines 18 and 21 so that substantially no current flows between these lines; thus, any AC or DC voltages appearing on the primary neutral 12 will not be transmitted through the switch 30 and will not appear on the secondary neutral line 15. In the event, however, of a breakdown of the transformer 13, such that voltages above a selected threshold switch-over voltage arc applied to the secondary neutral 15, the switching apparatus 30 switches to provide a low resistance connection between the grounding lines 18 and 21, thereby shunting any fault current from the secondary neutral 15 directly back to the primary neutral 12. In the case of a severe breakdown of the transformer 13, so that the primary hot line 11 is shorted to the secondary lines and particularly the secondary neutral, the surge of current flowing from the primary line 11 through the secondary neutral 15 and the switch 30 back to the primary neutral 12 should cause the fuse 17 at the transformer to blow and disconnect the primary hot line 11 from the transformer.

The low resistant of the driven secondary ground rods 24 and 55 combine with the relatively high "normally off" resistance of the thyristor to ensure that only very low (in the order of a microampere) current can flow through a cow to ground. Currents this low are not sensed by a cow.

Figure 2:
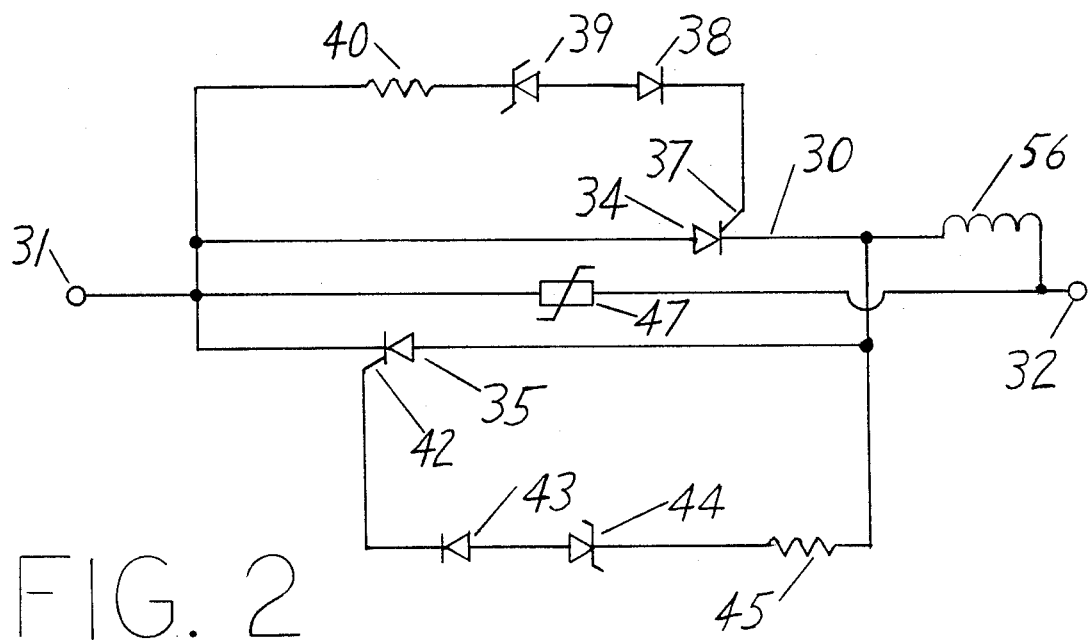
FIG. 2 is a schematic diagram of the neutral voltage isolation apparatus showing the electrical components thereof.

An electrical schematic of the preferred embodiment of the high speed switching apparatus 30 is shown in FIG. 2, wherein the apparatus is connected between a first (primary) terminal 31 and a second (secondary) terminal 32. The apparatus 30 includes a pair of triggerable electronic switches, thyristors (e.g., silicon controlled rectifiers) 34 and 35 connected in parallel and with opposite polarity of conduction, an inductor 56 connected in series with the paralleled thyristors, a varistor 47 connected in parallel with the series-parallel combination of thyristors and inductor, the entire combination connected between terminals 31 and 32. In their normal, untriggered state, the thyristors 34 and 35 provide a very high resistance to current flow in both directions, so that the terminals 31 and 32 are electrically isolated from one another.

The gate 37 of the thyristor 34 is connected to the primary terminal 31 through the series connection of a rectifier diode 38, a zener diode 39, and a resistor 40. The rectifier diode 38 is connected to have the same polarity as the thyristor 34, blocking any reverse current that might flow from the secondary terminal 32 through the cathode and gate of the thyristor 34 to terminal 31 and thereby preventing any damage that might be caused by reverse polarity overvoltages appearing between the cathode and gate of the thyristor. The zener diode is connected with polarity appropriate to block current flowing from the primary terminal 31 to the gate 37 of the SCR below its breakover voltage while passing current above the breakover voltage. The resistor 40 is selected to limit current flowing into the gate under expected transient voltage conditions until the thyristor 39 is triggered to conduct. The breakover voltage of the zener 39 is select cd so that voltages below those deemed to indicate a fault or dangerous surge are completely blocked by the zener, while voltages above the threshold arc passed to the gate to trigger the thyristor and cause a direct electrical connection to be made therethrough between the terminals 31 and 32. It has been found that a satisfactory typical breakover voltage for the zener diode 39 is in the range of 36 volts peak (approximately 25 volts RMS) since voltages of this magnitude generally present no substantial shock hazard of dangerous shock to animals or humans.

The gate 42 of the thyristor 35 is similarly connected to the second terminal 32 through a rectifier diode 43, having the same polarity as that of the thyristor 35, a zener diode 44, a resistor 45, and inductor 56. Again, the zener 44 is selected to break over at a desired maximum fault voltage, such as 36 volts peak, such that the thyristor 35 presents a very high impedance below the breakover voltage of the zener 44 and is triggered by the current passing through the zener when higher voltages are applied between the terminals 32 and 31. The inductor 56 has a value determined by the following criteria: it must present a low impedance to power frequency currents and a high impedance to rapidly rising transient currents. It is also determined by the "turn on" voltage of the varistor and finally by the maximum allowable rate of rise of current through the thyristor. In practice, a value of about 4 microhenries has provided excellent results when used with a varistor having a turn on voltage of about several hundred volts.

When an AC voltage exceeding the breakover voltage of the zener diodes 39 and 44 is applied across the terminals 31 and 32, each thyristor will remain off until the voltage across it in its direction of conduction exceeds the breakover voltage of the zener diode connected to its gate, whereafter the thyristor conducts and the voltage across the terminals is reduced to essentially zero. The conducting thyristor shuts off during the next half cycle of voltage while the other thyristor remains nonconducting until the breakover voltage of its zener is reached, after which it conducts.

The thyristor 34 and 35 are selected to be able to conduct the maximum power frequency currents that would ordinarily be expected. Since the thyristors 34 and 35 will generally each be conducting during breakdown conditions only for alternate half cycles, the burnout current-time ratings required for these devices are reasonable and suitable rated thyristors are commercially available. It should be noted, however, that commercially available thyristors are not available with suitably high rates of rise of current, such as would occur during a lightning stroke, and that the attainment of the capability of handling such currents is one of the objects of the present invention.

Varistor 47 is preferably chosen to have extremely high resistance to current flow at voltages across it below expected fault voltages and to have very low resistance to current flow at higher voltages. Spark gaps, gas tubes, and metal oxide varistors are some of the devices with these characteristics. The preferred varistor is of the metal oxide type with turn on voltages of about 400 volts.

It is apparent that additional variations of the circuit shown in FIG. 2 could also be utilized. For example, the rectifier diodes 38 and 43 could be eliminated and rectifier diodes could be placed in series with the thyristors; e.g., a rectifier diode could be placed in the line between the cathode of the thyristor 34 and the inductor 56 to prevent back currents flowing into the cathode of the thyristor, and a rectifier diode could be placed in the line between the primary terminal 31 and the cathode of the thyristor 35 for the same purpose. In accordance with customary design procedures utilizing thyristors, the single thyristors 34 and 35 could be replaced by multiple paralleled thyristors or a suitably triggered triac.

Figure 4:
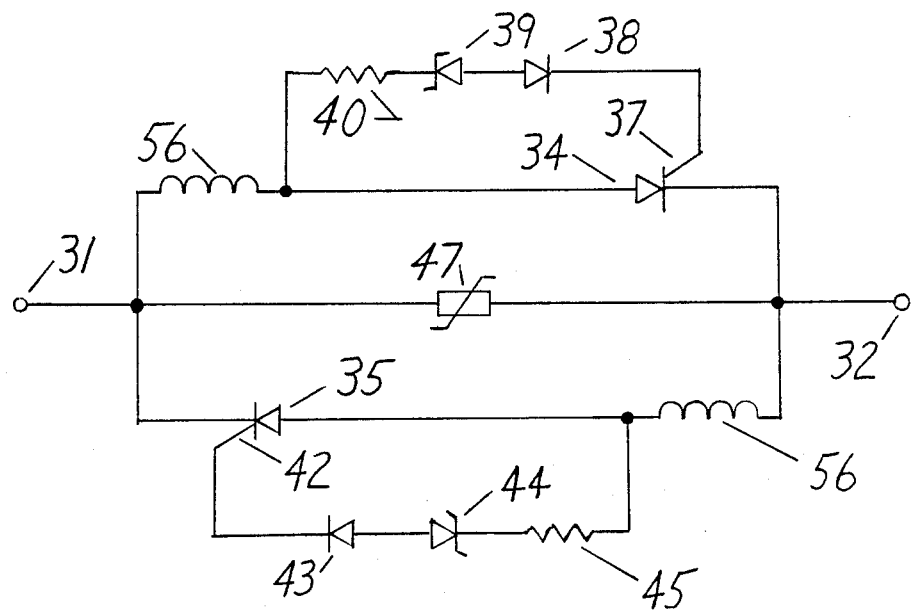
FIG. 4 is a schematic diagram for an isolation apparatus which is more effective than present "state of the art" electronic switches, although not as effective as the preferred embodiment.

An alternative version of the isolator switch is shown in FIG. 4. This configuration offers certain manufacturing conveniences, but in tests was not able to "close in" on currents as high in magnitude and rate of rise as was the preferred embodiment of FIG. 2. The alternate configuration of FIG. 4. does however represent a significant improvement over "state of the art" devices.

The only difference between FIG. 4 and FIG. 2 is that two inductors 56 (one for each thyristor) are used in FIG 4, while one common inductor 56 is used by both thyristors in FIG. 2. In both cases, the inductors 56 have the same value in microhenries and the discussion of FIG. 2 applies to FIG. 4 in other regards.

Figure 3:
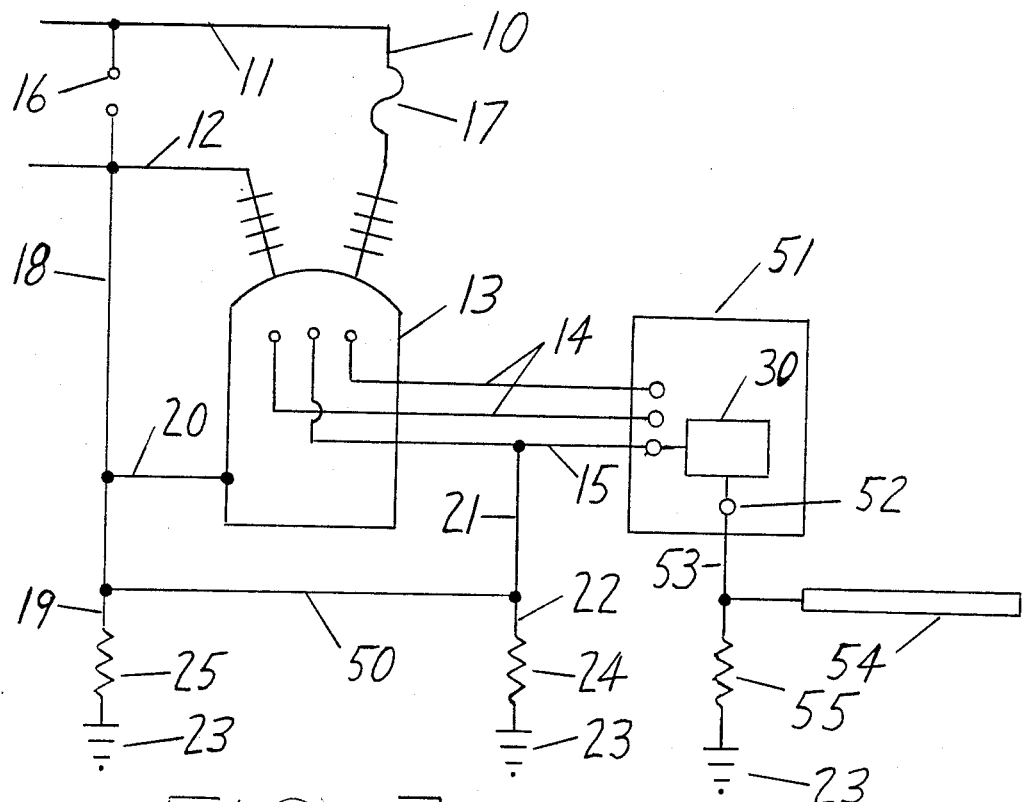
FIG. 3 is a schematic view of an electrical distribution transformer system with the neutral voltage isolation apparatus connected in an alternate position at the service panel.

An alternative placement of the neutral voltage isolation apparatus 30 which provides isolation of grounded equipment from the service transformer ground is illustrated in FIG. 3. The transformer 13 and its primary and secondary lines are connected identically to the system shown in FIG. 1 except that the primary neutral grounding line 18 and the secondary neutral grounding line 21 are connected in the conventional manner with a conductor 50. Thus, voltage transients on the primary neutral will be transmitted to the secondary neutral. However, at the service panel 51, the isolation apparatus 30 is connected between the secondary neutral line 15 and the grounding terminal 52 of the service panel. A local grounding line 53 extends from the terminal 52 to various metallic objects and equipment 54 (for example, stanchions and waterlines), and is also connected to a local grounding rod, indicated at 55 in FIG. 3. Operating in the manner described above, the isolation apparatus 30 normally isolates the ground lines 53 and the equipment to which it is connected from low voltages on the neutral line 15 but switches to connect the local ground line 53 to the neutral 15 when sufficiently large voltages appear across the apparatus 30. The direct electrical connection between the primary and secondary neutrals of the transformer 13 provided by the conductor 50 will shunt any fault current through the transformer back to the utility neutral as in conventional systems.

It is understood that the invention is not confined to the particular construction and arrangement of the embodiment herein illustrated and described, but embraces such modified forms thereof as come within the scope of the following claims.

What is claimed is:

1. In an electrical power distribution system having a service transformer with primary terminals to which a primary high voltage line and neutral line are oonneoted and secondary terminals to which a high voltage line and a neutral line are connected, a primary grounding line connected between the primary neutral line and ground, and a secondary grounding line connected from the secondary neutral line to ground, the improveent comprising:

(a) a pair of high speed triggerable electronic switches connected in parallel with opposite directions of polarity, the parallel combination connected in series with an inductor, the resulting series-parallel combination connected in parallel with a varistor between first and second terminals connected, respectively, to the primary and secondary neutral lines of the transformer, the impedance of each of the switches being normally high in both directions of conduction, and each having a triggering input terminal such that when a triggering pulse is applied to the terminal, the electronic switch provides low impedance thercacross in its forward direction of current flow; and (b) means responsive to the voltage across the first and second terminals for applying triggering signals lo the triggering inputs of the electronic switches such that a respective one of the switches is triggered to conduct in its forward direction when the voltage across the first and second terminals in the respective switch in the forward direction of conduction is greater than a preselected voltage level.

2. The system of claim 1 wherein the electronic switches are silicon controlled rectifier thyristors having an anode, a cathode and a gate input, and a forward direction of conduction from the anode to the cathode and the means for applying triggering signals includes a rectifier diode, a zener diode, and a resister for each of the thyristors electrically connected in series between the anode of the respective thyristor and the gate of the respective thyristor, each rectifier diode having the same polarity of forward conduction as the respective thyristor to which it is connected and each zener diode having polarity opposite to that of the respective thyristor to which it is connected and having a breakover voltage equal to the selected triggering voltage.

3. The system of claim 1 wherein the electronic switches are silicon controlled rectifier thyristors having an anode, a cathode and a gate input, and a forward direction of conduction from the anode to the cathode and the means for applying triggering signals includes a rectifier diode, a zener diode, and a resistor for each of the thyristors electrically connected in series between the anode of the respective thyristor and the gate of the respective thyristor, each rectifier diode having the same polarity of forward conduction as the respective thyristor to which it is connected and each zener diode having polarity opposite to that of the respective thyristor to which it is connected and having a breakover voltage equal to the selected triggering voltage; and wherein the inductor has a value between 0.5 and 20.0 microhenries and the varistor is a Metal Oxide Varistor having a turn on voltage between 150 and 800 volts and an energy handling capability between 50 and 2000 joules.

4. In an electrical power distribution system having a service transformer with primary terminals to which a primary high voltage line and neutral line are connected and secondary terminals to which a high voltage line and a neutral line are connected, a primary grounding line connected between the primary neutral line and ground, a secondary grounding line connected from the secondary grounding line connected from the secondary neutral line to ground, an electrical conductor connected between the primary and secondary neutral lines, and a local ground line connected to ground and to equipment to be grounded, the improvement comprising:

(a) a pair of high speed lriggerable electronic switches connected in parallel with opposite direotions of polarity, the parallel combination connected in series with an inductor, the resulting series-parallel combination connected in parallel with a varistor between first and second terminals connected, respectively, to the transformer secondary neutral line and the local ground line, the impedance of each of the switches being normally high in both directions of conduction, and each having a triggering input terminal such that when a triggering pulse is applied to the terminal, the electronic switch provides low impedance thereacross in its forward direction of current flow; and (b) means responsive to the voltage across the first and second terminals for applying triggering signals to the triggering inputs of the electronic switches such that a respective one of the switches is triggered to conduct in its forward direction when the voltage across the first and second terminals in the respective switch in the forward direction of conduction is greater than a preselected voltage level.

5. The system of claim 4 wherein the electronic switches are silicon controlled rectifier thyristors having an anode, a cathode and a gate input, and a forward direction of conduction from the anode to the cathode and the means for applying triggering signals includes a rectifier diode, a zener diode, and a resistor for each of the thyristors electrically connected in series between the anode of the respeclive thyristor and the gate of the respective thyristor, each rectifier diode having the same polarity of forward conduction as the respective thyristor to which it is connected and each zener diode having polarity opposite to that of the respective thyristor to which it is connected and having a breakover voltage equal to the selected triggering voltage.

6. The system of claim 4 wherein the electronic switches are silicon controlled rectifier thyristors having an anode, a cathode and a gate input, and a forward direction of conduction from the anode to the cathode and the means for applying triggering signals includes a rectifier diode, a zener diode, and a resistor for each of the thyristors electrically connected in series between the anode of the respective thyristor and the gate of the respective thyristor, each rectifier diode having the same polarity of forward conduction as the respective thyristor to which it is connected and each zener diode having polarity opposite to that of the respective thyristor to which it is connected and having a breakover voltage equal to the select cd triggering voltage; and wherein the inductor has a value between 0.5 and 20.0 microhenries and the varistor is a Metal Oxide Varistor having a turn on voltage between 150 and 800 volts and an energy handling capability between 50 and 2000 joules.

* * * * *

REEXAMINATION CERTIFICATE (2901th)

United States Patent [19]

Kotski

[11] B1 4,958,250

[45] Certificate Issued Jun. 4, 1996

[54] VOLTAGE ISOLATION APPARATUS FOR SERVICE TRANSFORMERS

[76] Inventor: Edward J. Kotski, 124 Pleasantview Rd., Hackettstown, N.J. 07840

Reexamination Request:
No. 90/003,595, Oct. 10, 1994

Reexamination Certificate for:
Patent No.: 4,958,250
Issued: Sep. 18, 1990
Appl. No.: 767,108
Filed: Oct. 19, 1985

[51] Int. Cl.⁶ .................................................. H02H 7/10
[52] U.S. Cl. ................................ 361/40; 361/56; 361/91
[58] Field of Search ............................ 361/36, 39, 40, 361/43, 45, 47, 49, 91, 111, 117, 126, 127, 56

[56] References Cited

U.S. PATENT DOCUMENTS 4,217,618  8/1980  Kellenbenz et al. .
4,475,139  10/1984  Chadwick .

OTHER PUBLICATIONS

Finney, *The Power Thyristor and its Applications*, pp. 114–122, 319–323, McGraw–Hill, UK, 1980.
Hoft, *SCR Applications Handbook*, pp. 57–58, (1974).
Schlenk, "'F Materials' for Thyristor Protective Reactors", *Siemen's Review*, pp. 444–445, (1976).
Blicher, *Thyristor Physics*, pp. 292–293, (1976).
Dewan, et al., *Power Semiconductor Circuits*, pp. 125–126, 239, (1975).
Gustafson, et al., "Techniques for Coping with Stray Voltages", pp. 11–15, Agricultural Engineering, Dec., (1984).

Allegheny Power System, *Transmission and Distribution Power System*, Grounding Section, Natural–to–Earth Voltage, 29 pgs., Oct. 31, (1983).
Surbrook, et al. Workshop on Stray Voltages in Agriculture, "Presently Used Treatments or Corrective Procedures for Stray Voltage Problems", pp. 93–107, Aug. 10–11, (1983).
Gustafson, et al., "Circuit Analysis of Stray Voltage Interrupt and Offset Devices", Paper No. 84–3004, American Society of Agricultural Engineers, pp. 1–17, Jun. 24–25, (1984).
Pitt (ed.), *The Penguin Dictionary of Physics*, pp. 346–347, (1977).
Neutral Isolator Advertising Brochure, by Dairyland Electrical Industries, Inc. (1984).

*Primary Examiner*—Todd E. DeBoer

[57] ABSTRACT

A switching apparatus (30) provides a normally high impedance connection which is capable of switching currents with high magnitudes and high rates of rise between the primary (12) and secondary (15) neutrals of a service transformer (13), such as that used to supply power to a farmstead, such that undesirable voltages appearing on the primary neutral line are not transmitted to the secondary neutral. Upon the occurrence of a fault at the distribution transformer, or a surge on the power line, the switching apparatus (30) rapidly switches to provide a low resistance connection between the primary and secondary neutrals so that any fault current passing from the primary to the secondary of the transformer will be shunted back to the primary neutral. The apparatus preferably includes a pair of high speed electronic switches (34, 35), such as SCR thyristors, connected in parallel with opposite polarity, the combined SCR's connected in series with an indicator, and the resulting series-parallel combination connected in parallel with a varistor between the primary and secondary neutrals.

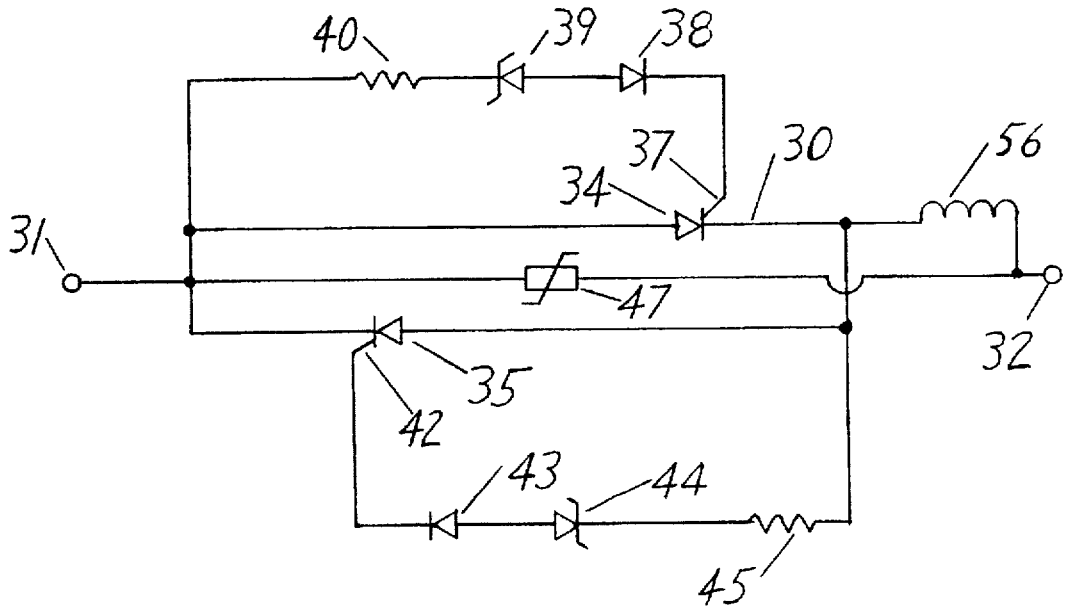

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-6 are cancelled.

* * * * *